US008959342B2

(12) United States Patent
Hatakeyama (10) Patent No.: US 8,959,342 B2
(45) Date of Patent: Feb. 17, 2015

(54) COMMUNICATION APPARATUS

(75) Inventor: Hideyuki Hatakeyama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 691 days.

(21) Appl. No.: 12/964,041

(22) Filed: Dec. 9, 2010

(65) Prior Publication Data

US 2011/0179276 A1    Jul. 21, 2011

(30) Foreign Application Priority Data

Jan. 15, 2010    (JP) ................................. 2010-006750

(51) Int. Cl.
*H04L 9/32* (2006.01)
*H04L 9/08* (2006.01)

(52) U.S. Cl.
CPC ............ *H04L 9/0844* (2013.01); *H04L 9/3271* (2013.01)
USPC ............... 713/168; 713/170; 713/171; 726/2; 726/3

(58) Field of Classification Search
USPC .............. 713/168, 170, 171; 726/2, 3, 27, 29; 380/283; 370/252; 705/51, 57; 725/25; 455/410, 411, 456.1
See application file for complete search history.

(56) References Cited

U.S. PATENT DOCUMENTS

| 7,058,414 | B1 * | 6/2006 | Rofheart et al. | 455/456.4 |
| 7,487,351 | B2 | 2/2009 | Ayaki et al. | |
| 2007/0058559 | A1 * | 3/2007 | Xu | 370/252 |
| 2008/0212559 | A1 * | 9/2008 | Mahesh et al. | 370/345 |
| 2009/0310574 | A1 * | 12/2009 | Jeon et al. | 370/336 |

* cited by examiner

*Primary Examiner* — Saleh Najjar
*Assistant Examiner* — Peiliang Pan
(74) *Attorney, Agent, or Firm* — Brinks Gilson & Lione (57) ABSTRACT

A communication apparatus performs data communication with a communication device, and includes an authentication processing portion configured to perform authentication processing, including a round trip time (RTT) test on authentication requests received from one or more unauthenticated communication devices and a data communication portion configured to perform data communications with the communication device authenticated by the authentication processing portion. If, in authentication processing of a current authentication request, a prior RTT test is being performed corresponding to a prior authentication request originating from the same communication device, the current RTT test is not performed, and authentication processing waits for the completion of the prior RTT test. If the result of the prior RTT test is successful, authentication processing uses the result of the prior RTT test as the result corresponding to the current authentication request.

18 Claims, 4 Drawing Sheets

COMMUNICATION APPARATUS

PRIORITY CLAIM

This application claims the benefit of Japanese Patent Application No. 2010-006750, filed on Jan. 15, 2010, and which is incorporated by reference herein in its entirety.

BACKGROUND

1. Field of the Invention

The present invention relates to a technology of a Round Trip Time (RTT) test to be performed for authenticating an apparatus in a communication system.

2. Description of the Related Art

In a communication system, a technology of a Round Trip Time (RTT) test to be performed for authenticating an apparatus has been known in a system including a plurality of apparatuses connected over a network. In the system, a source that is an apparatus transmitting a content authenticates an apparatus that is a destination of the content and transmits the content to the authenticated apparatus. (Refer to Japanese Unexamined Patent Application Publication No. 2004-295337 and Hitachi, Ltd., Intel Corporation, Matsushita Electric Industrial Co., Ltd., Sony Corporation and Toshiba Corporation, "DTCP Volume 1 supplement F DTCP 1394 Additional Localization D (Informational Version)", P. 4-9, [online], Jun. 15, 2007, Digital Transmission Licensing Administrator (DTLA), [searched on Dec. 22, 2009], the Internet (http://www.dtcp.com/data/info 20070615 DTCP V1SF 1p 0.pdf)).

According to the technology, when receiving an authentication request from another apparatus, the source checks whether the apparatus having issued the authentication request has already passed an RTT test (including measuring an RTT and determining whether the RTT is within a predetermined period of time or not). If it has passed, the processing moves to the authentication processing. If not, the source performs an RTT test on the apparatus having issued the authentication request. Only if the apparatus passes the RTT test, the processing moves to authentication processing. Thus, the range of transmission of the content from the source can be limited to a local range.

As described above, when the source receives an authentication request from another apparatus, an RTT test may be performed on the apparatus having issued the authentication request. In that case however, because one apparatus may require authentication processing for each channel used for transferring a content for the apparatus configuration or may need independent encoding for each content, authentication requests may be serially issued to the source for a plurality of contents to be received from the source. Then, the following problems may occur.

In other words, when authentication requests are processed in parallel, a plurality of RTT tests are to be performed redundantly on the same apparatus having issued the authentication request because the apparatus has not passed the RTT test. This may induce the failure of the RTT tests because an increased load may be imposed on the apparatus having issued the authentication request.

On the other hand, when authentication requests are processed one by one sequentially, processing on later authentication requests may relatively delay.

SUMMARY

Accordingly, it is an object of the present invention to prevent delay of authentication processing and prevent redundant implementation of RTT tests on the same apparatus.

In order to achieve the object, there is provided a communication apparatus that performs data communication with a communication device, the communication apparatus including an authentication processing portion that performs authentication processing including an RTT test on authentication requests received from the unauthenticated communication devices, and a data communication portion that performs the data communication with the communication device authenticated by the authentication processing portion. If, in authentication processing on the authentication requests, the RTT test is being performed in other authentication processing on another authentication request originating from the same communication device as the authentication request to undergo the authentication processing, the authentication processing portion does not perform the RTT test in the authentication processing but waits for the completion of the RTT test in the other authentication processing and, if the result of the RTT test in the other authentication processing is pass, the authentication processing portion omits the RTT test in the authentication processing and uses the result of the RTT test in the other authentication processing as the result of the RTT test in the authentication processing.

If, in authentication processing on the authentication requests, the RTT test is being performed in other authentication processing on another authentication request originating from the same communication device as the authentication request to undergo the authentication processing, the authentication processing portion may not perform the RTT test in the authentication processing but waits for the completion of the RTT test in the other authentication processing and, if the result of the RTT test in the other authentication processing is not pass, the authentication processing portion may perform the RTT test in the authentication processing.

More specifically, for example, the authentication processing may include first processing for sharing an authentication key with the communication device having issued the target authentication request, the RTT test, and second processing of transmitting an exchange key encoded by using the authentication key to the communication device. The communication portion may perform the encoded data communication by using the exchange key with the communication device to which the exchange key has been transmitted. If, in authentication processing on the authentication requests, after performing the first processing, the RTT test is being performed in other authentication processing on another authentication request originating from the same communication device as the authentication request to undergo the authentication processing, the authentication processing portion may not perform the RTT test in the authentication processing but waits for the completion of the RTT test in the other authentication processing and, if the result of the RTT test in the other authentication processing is pass, the authentication processing portion may perform the second processing. In this case, if, in authentication processing on the authentication requests, after performing the first processing, the RTT test is being performed in other authentication processing on another authentication request originating from the same communication device as the authentication request to undergo the authentication processing, the authentication processing portion may not perform the RTT test in the authentication processing but waits for the completion of the RTT test in the other authentication processing and, if the result of the RTT test in the other authentication processing is not pass, the authentication processing portion may perform the RTT test in the authentication processing, if the result of the RTT test is pass, the authentication processing portion performs the second processing, and if the result of the RTT test in the other authentication processing is not pass, the authentication processing portion may not perform the second processing.

In the communication apparatus, if, in authentication processing, the RTT test is being performed in other authentication processing on another authentication request originating from the same communication device as the authentication request to undergo the authentication processing, the authentication processing portion waits for the completion of the RTT test in the other authentication processing and, if the result of the RTT test in the other authentication processing is pass, the result of the RTT test in the other authentication processing is used as the result of the RTT test in the authentication processing.

Thus, redundant implementation of an RTT test on one communication device can be prevented if the communication device has passed the RTT test. Since it can eliminate the necessity for sequentially performing entire authentication processing on authentication requests, delay of authentication processing can be prevented.

In order to achieve the object, there is provided a communication apparatus that performs data communication with a communication device, the communication apparatus comprising:

an authentication processing portion that performs authentication processing including an RTT test on authentication requests received from the unauthenticated communication devices; and a data communication portion that performs the data communication with the communication device authenticated by the authentication processing portion, wherein:

if, in authentication processing on the authentication requests, the RTT test is being performed in other authentication processing on another authentication request originating from the same communication device as the authentication request to undergo the authentication processing, the authentication processing portion does not perform the RTT test in the authentication processing and uses the result of the RTT test in the other authentication processing as the result of the RTT test in the authentication processing.

More specifically, the authentication processing may include first processing for sharing an authentication key with the communication device having issued the target authentication request, the RTT test, and second processing of transmitting an exchange key encoded by using the authentication key to the communication device. The communication portion may perform the encoded data communication by using the exchange key with the communication device to which the exchange key has been transmitted. If, in authentication processing on the authentication requests, after performing the first processing, the RTT test is being performed in other authentication processing on another authentication request originating from the same communication device as the authentication request to undergo the authentication processing, the authentication processing portion may not perform the RTT test in the authentication processing but wait for the completion of the RTT test in the other authentication processing and, if the result of the RTT test in the other authentication processing is pass, the authentication processing portion may perform the second processing. If the result of the RTT test in the other authentication processing is not pass, the authentication processing portion may not perform the second processing.

In the communication apparatus, if, in authentication processing, the RTT test is being performed in other authentication processing on another authentication request originating from the same communication device as the authentication request to undergo the authentication processing, the authentication processing portion may not perform the RTT test in the authentication processing but uses the result of the RTT test in the other authentication processing as the result of the RTT test in the authentication processing. Thus, redundant implementation of an RTT test on the same communication device can be prevented. Since it can eliminate the necessity for sequentially performing entire authentication processing on authentication requests, delay of authentication processing can be prevented.

In the communication apparatus, the communication apparatus and the communication device may perform data communication based on the IEEE1394 standard, and the authentication processing may perform authentication based on the DTCP standard. In the communication apparatus, the communication portion may transmit data of an audio/visual (AV) content in the data communication.

As described above, according to the present invention, delay of authentication processing can be prevented, and redundant RTT tests on the same apparatus can be prevented.

DETAILED DESCRIPTION

An embodiment of the present invention will be described below.

Figure 1:
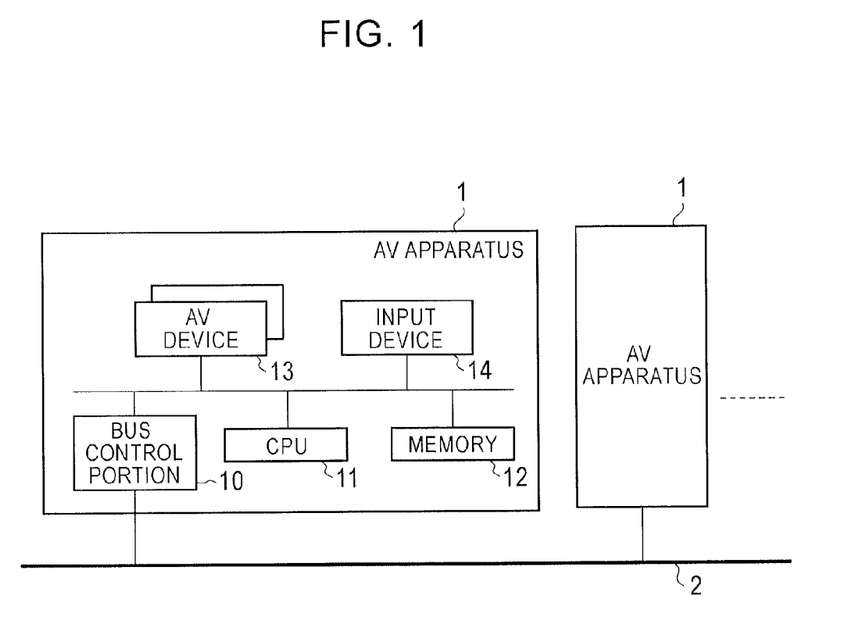
FIG. 1 is a block diagram illustrating a configuration of an AV system according to an embodiment of the present invention.

FIG. 1 illustrates a configuration of an AV system according to the embodiment.

The AV system illustrated in FIG. 1 includes a plurality of AV apparatuses 1 connected via a bus 2 based on the IEEE 1394 standard.

Here, the each of the AV apparatuses 1 includes a bus control portion 10, a CPU 11, a memory 12, an AV device 13, and an input device 14. The AV device 13 receives input of and/or outputs at least one of audio and visual signals. The AV device 13 may be a display, an audio player, a video player, a television receiver, a radio receiver, an audio output device or the like.

Figure 2:
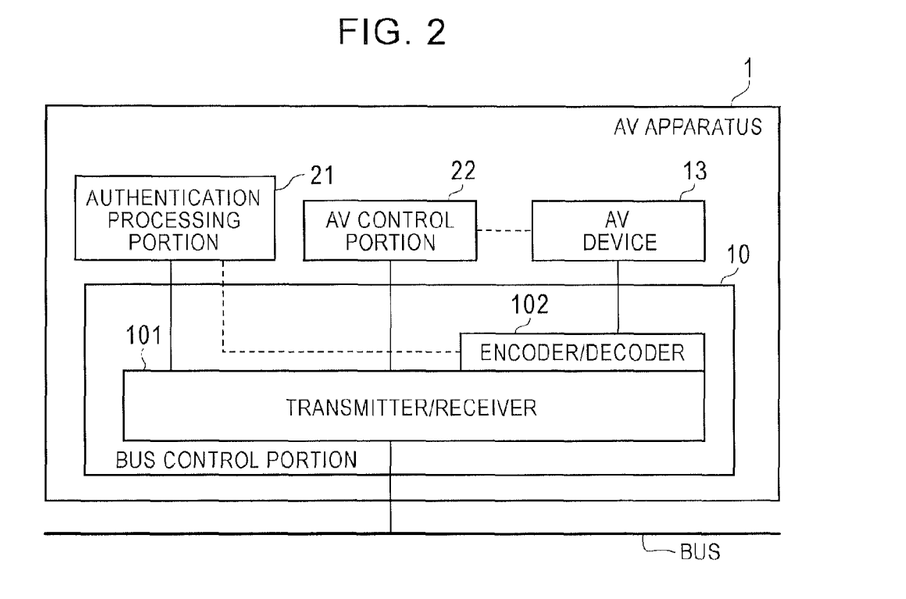
FIG. 2 is a block diagram illustrating a functional configuration of the AV apparatus according to the embodiment of the present invention.

FIG. 2 illustrates a functional configuration of the AV apparatus 1. An authentication processing portion 21 and AV control portion 22 illustrated in FIG. 2 are functions implemented by the execution of programs stored in the memory 12 by the CPU 11.

As illustrated in FIG. 2, the bus control portion 10 includes a transmitter/receiver 101 that inputs and/or receives the output of a signal to/from the bus 2 and an encoder/decoder 102 that encodes/decodes content data transmitted from the AV device 13 to another device via the bus 2 or received from another device via the bus 2.

The AV control portion 22 controls an operation by the AV apparatus 1 in accordance with a user operation or a command received from another AV apparatus 1 through the bus control portion 10.

The authentication processing portion 21 controls authentication operations between a source and a sink.

The authentication operations between a source and a sink are based on DTCP disclosed in "DTCP Volume 1 supplement F DTCP 1394 Additional Localization D (Informational Version)" above.

Figure 3:
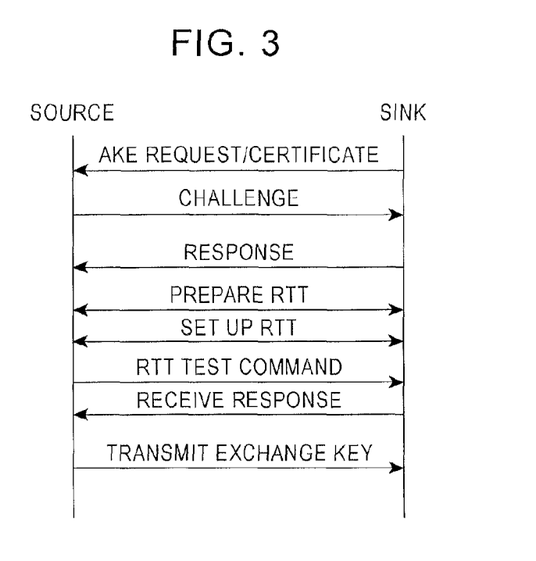
FIG. 3 illustrates sequences of authentication operations.

FIG. 3 illustrates overall sequences of basic authentication operations between a source and a sink.

As illustrated in FIG. 3, a sink first of all issues to a source an authentication and key exchange (AKE) request for authentication and key exchange including a certificate.

The source here refers to an AV apparatus 1 that transmits content data to another AV apparatus, and the sink refers to an AV apparatus 1 that receives content data from the source AV apparatus 1.

If the validity of an AKE request originator is authenticated by using the certificate, the source performs challenge-response sequences of exchanging predetermined information through a challenge and a response with the AKE request originator and generating a common authentication key between the source and the AKE request originator.

If the challenge-response sequences succeed, an RTT test is performed. In the RTT test, the source first exchanges a predetermined command/response with the sink for preparation for the RTT test. After an RTT test is set up by the exchange of predetermined command/response with the sink, an RTT test command is transmitted to the sink. Then, a reception response transmitted from the sink is received as the response. In accordance with the time length from the transmission of the RTT test command to the reception of the reception response, the RTT is measured and whether the measured RTT exceeds a predetermined limit time or not is determined. If not, it is determined that the sink has passed the RTT test.

If the sink has passed the RTT test, the exchange key encoded by using the authentication key is transmitted to the AKE request originator.

These authentication operations are implemented by authentication processing performed by the authentication processing portion 21 in the source.

The authentication processing to be performed by the authentication processing portion 21 in the source will be described below.

Figure 4A:
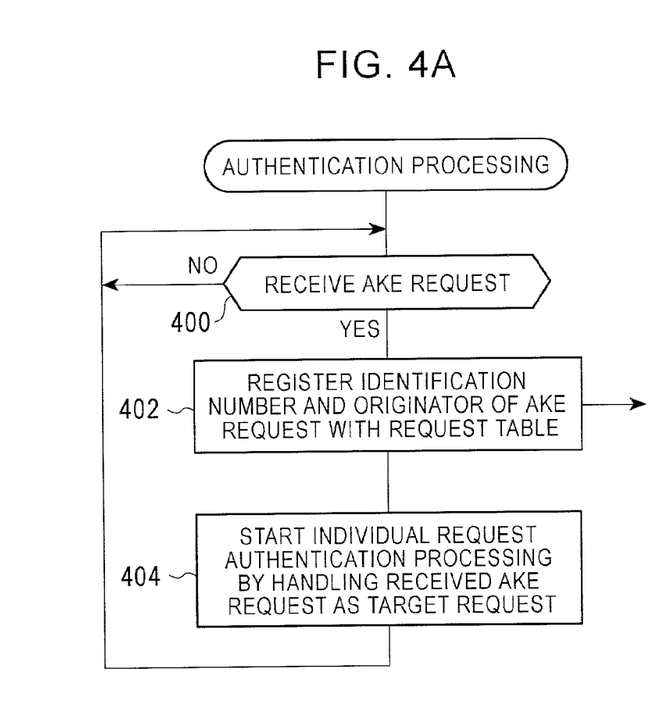
FIGS. 4A and 4B are flowcharts illustrating the authentication processing according to the embodiment of the present invention.

FIG. 4A illustrates a routine of the authentication processing.

As illustrated in FIG. 4A, the processing first monitors the reception of an AKE request (step 400).

Figure 4B:
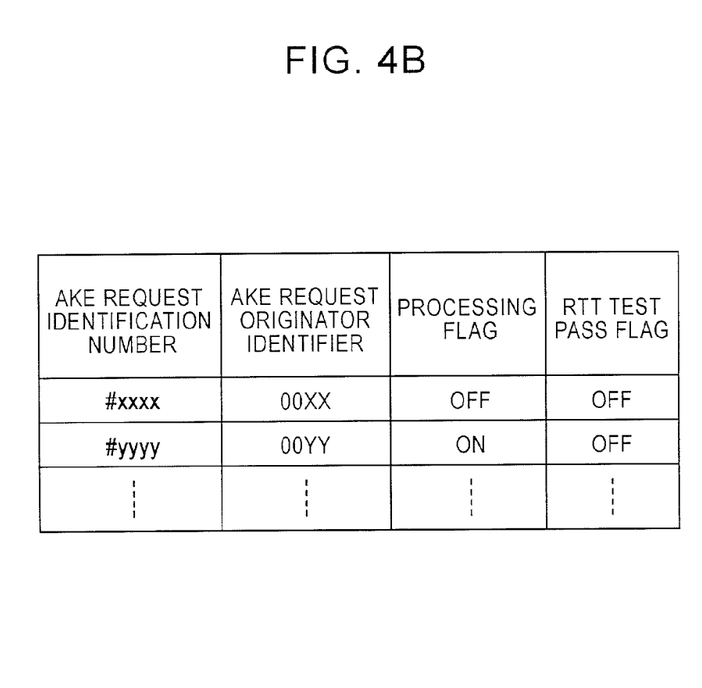

If an AKE request is received, the processing stores the identification number given to the received AKE request along with an identifier such as the node number of the originator of the AKE request in a request table as illustrated in FIG. 4B (step 402).

As illustrated in FIG. 4B, an identification number given to an AKE request, an identifier of the originator of the AKE request, a processing flag, and an RTT test pass flag may be registered with an entry (row in FIG. 4B) in the request table. The initial values of the processing flag and RTT test pass flag are "OFF".

Next, individual request authentication processing is started on the received AKE request assigned as a target request (step 404).

The processing then returns to monitoring in step 402.

Figure 5:
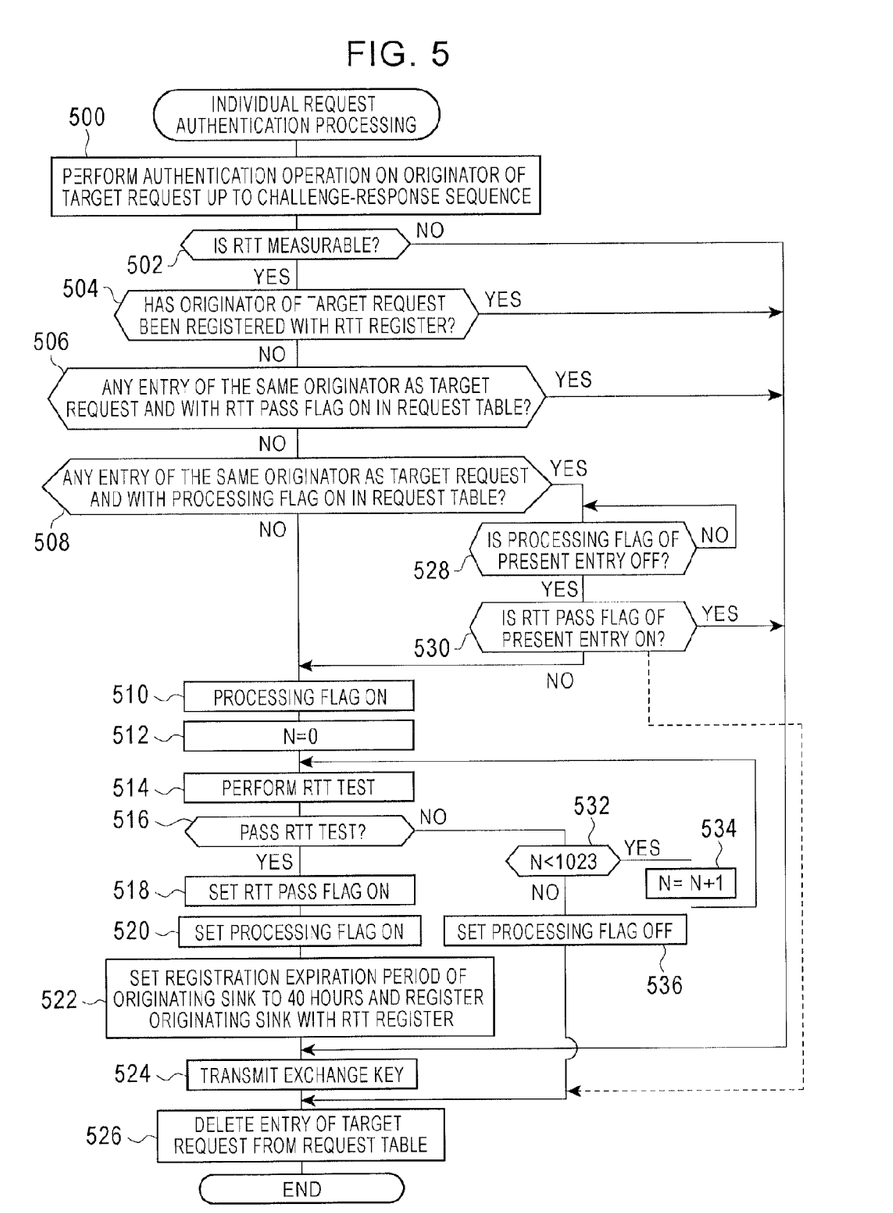
FIG. 5 is a flowchart illustrating individual request authentication processing according to the embodiment of the present invention.

FIG. 5 illustrates a routine of the individual request authentication processing to be started in step 404 of the authentication processing.

As illustrated in FIG. 5, the processing first performs the authentication operations up to the challenge-response sequences on the originator of the AKE request assigned as the target request (step 500).

Whether an RTT is measurable or not is checked (step 502). If not, the exchange key encoded with the authentication key shared in the challenge-response sequences performed to and from the originator is transmitted to the originator of the AKE request assigned as the target request (step 524). The entry having the identification number of the AKE request assigned as the target request is deleted from the request table (step 526), and the individual request authentication processing ends.

If an RTT is measurable (step 502) on the other hand, the sink being the originator of the AKE request assigned as the target request checks whether the sink has already been registered with an RTT register that stores a sink that had passed an RTT test or not (step 504).

If not (step 504), whether any other entry that stores the same originator as the originator registered with the entry having the identification number of the AKE request assigned as the target request in the request table in FIG. 4B and has "ON" as the value of the RTT test pass flag exists in the request table or not is checked (step 506).

If not (step 506), whether any other entry that stores the same originator as the originator registered with the entry having the identification number of the AKE request assigned as the target request in the request table and has "ON" as the value of the processing flag exists in the request table or not is further checked (step 508). If not, the processing moves to step 510.

In step 510, the processing flag of the entry having the identification number of the AKE request assigned as the target request in the request table is set to "ON".

Then, an RTT test is performed on the originator of the AKE request assigned as the target request up to 1024 times until the originator passes the RTT test (step 512-516 and 532-534).

As illustrated in FIG. 3, in order to perform the first RTT test, the preparation for the RTT test is implemented and the RTT test is set up between the source and the sink being the originator of the AKE request assigned as the target request. The an RTT test command is transmitted to the sink, and a reception response transmitted from the sink is received as the response. In accordance with the time length from the transmission of the RTT test command to the reception of the reception response, the RTT is measured, and whether the measured RTT does not exceed a predetermined time limit or not is determined. If not, it is determined that the sink has passed the RTT test.

For the second and subsequent RTT tests, the preparation for the RTT tests has already been completed. Thus, after an RTT test is set up, an RTT test command is transmitted to the sink. A reception response transmitted from the sink is received as the response. In accordance with the time length from the transmission of the RTT test command to the reception of the reception response, the RTT is measured, and whether the measured RTT does not exceed a predetermined time limit or not is determined. If not, it is determined that the sink has passed the RTT test.

If the sink does not pass the RTT test even after 1024 implementations of the RTT test (step 532), the processing flag in the entry having the identification number of the AKE request assigned as the target request in the request table is set to "OFF" (step 536). The entry having the identification number of the AKE request assigned as the target request is deleted from the request table (step 526), and the individual request authentication processing ends.

If the sink passes the RTT test before 1024 implementations of the RTT test on the other hand (step 516), the RTT test pass flag in the entry having the identification number of the AKE request assigned as the target request in the request table is set to "ON" (step 518).

Then, the processing flag in the entry having the identification number of the AKE request assigned as the target request in the request table is set to "OFF" (step 520).

Next, the registration effective period of the sink being the originator of the AKE request assigned as the target request is set to 40 hours, and the sink being the originator of the AKE request assigned as the target request is registered with the RTT register (step 522). The sink registered with the RTT register is deleted from the RTT register after the expiration of the registration effective period.

Then, the exchange key encoded with the authentication key shared in the challenge-response sequences performed to and from the originator is transmitted to the originator of the AKE request assigned as the target request (step 524). The entry having the identification number of the AKE request assigned as the target request is deleted from the request table (step 526). Then, the individual request authentication processing ends.

If it is determined in step 508 that another entry that stores the same originator as the originator registered with the entry having the identification number of the AKE request assigned as the target request in the request table and has "ON" as the value of the processing flag exists in the request table, an RTT test is being performed in other individual request authentication processing on the originator of the AKE request assigned as the target request. Thus, the source waits for the setting of the processing flag of the other individual request authentication processing existing to "OFF" (step 528). Then, whether the RTT test pass flag in the entry existing is "ON" or not is checked (step 530).

If the RTT test pass flag is ON (step 530), it means that the RTT test on the originator of the AKE request assigned as the target request has ended as a result of the pass in the other individual request authentication processing. Thus, the result is used as the result of the RTT test on its individual request authentication processing, and the RTT test is not performed. The exchange key encoded with the authentication key shared in the challenge-response sequences performed to and from the originator is transmitted to the originator of the AKE request assigned as the target request (step 524). The entry having the identification number of the AKE request assigned as the target request is deleted from the request table (step 526), and the individual request authentication processing ends.

If the RTT test pass flag is not "ON" (step 530) on the other hand, the processing moves to step 510 described above. However, if the RTT test pass flag is not "ON", the entry having the identification number of the AKE request assigned as the target request may be deleted directly from request table (step 526) as indicated by the broken line in FIG. 5, and the individual request authentication processing may end.

If it is determined in step 506 that another entry in the request table that stores the same originator as the originator registered with the entry having the identification number of the AKE request assigned as the target request in the request table and has "ON" as the value of the RTT test pass flag exists in the request table, it means that the RTT test on the originator of the AKE request assigned as the target request has already ended as a result of the pass in the other individual request authentication processing. Thus, the result is used as the result of the RTT test on its individual request authentication processing, and the RTT test is not performed. The source transmits the exchange key encoded with the authentication key shared in the challenge-response sequences performed to and from the originator to the originator of the AKE request assigned as the target request (step 524). The entry having the identification number of the AKE request assigned as the target request is deleted from the request table (step 526), and the individual request authentication processing ends.

On the other hand, if it is determined in step 504 that the sink being the originator of the AKE request assigned as the target request has already been registered with the RTT register, it means that the sink of the originator of the AKE request assigned as the target request has already been authenticated. Thus, the exchange key encoded with the authentication key shared in the challenge-response sequences performed to and from the originator is transmitted to the originator of the AKE request assigned as the target request (step 524). The entry having the identification number of the AKE request assigned as the target request is deleted from the request table (step 526), and the individual request authentication processing ends.

The authentication processing and individual request authentication processing to be performed by the authentication processing portion 21 have been described above.

In the individual request authentication processing, the exchange key exchanged with the AKE request originator is set to the encoder/decoder 102 in the bus control portion 10 in the source. After that, the encoder/decoder 102 encodes the content data received from the AV apparatus 1 and to be transmitted through the transmitter/receiver 101 with the cryptographic key acquired by using the exchange key transmitted to the destination sink of the content data. The sink having received the exchange key from the source sets the exchange key to the encoder/decoder 102. After that, the encoder/decoder 102 decodes the content data received from the source with the cryptographic key acquired by using the exchange key received from the source of the origin of the content data and outputs the decoded data.

As described above, according to this embodiment, received AKE requests are processed in parallel in individual request authentication processing started for the AKE requests. In the individual request authentication processing, an RTT test on the AKE request from the same originator as the AKE request being processed is being performed in other individual request authentication processing, the RTT test is not performed but the processing waits for the end of the RTT test in the other individual request authentication processing. If the corresponding sink passes the RTT test in the other individual request authentication processing, the result of the RTT test in the other individual request authentication processing is used as the result of the RTT test in the individual request authentication processing. Then, it is determined that the sink has passed the RTT test for the AKE request being processed, and the authentication processing advances without performing the RTT test.

Thus, delay of authentication processing can be prevented, and redundant RTT tests on the sink having already passed the RTT test can be prevented.

If the RTT test pass flag is not "ON", the entry having the identification number of the AKE request assigned as the target request may be deleted directly from request table (step 526) as indicated by the broken line in FIG. 5, and the individual request authentication processing may end, as in step 530. Thus, the RTT test on the AKE request from the same originator as the AKE request being processed is performed in other individual request authentication processing, the result of the RTT test in other individual request authentication processing may be used as the result of the RTT test in the individual request authentication processing whether the result of the RTT test is pass or fail. Therefore, further implementation of the RTT test on the sink having already completed the RTT test can be prevented.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims.

What is claimed is:

1. A communication apparatus that performs data communication with a communication device, the communication apparatus comprising:
    an authentication processing portion configured to perform authentication processing based on a Digital Transmission Content Protection ("DTCP") standard, including a round trip time (RTT) test on authentication requests received from one or more unauthenticated communication devices;
    a data communication portion configured to perform data communications with the communication device authenticated by the authentication processing portion;
    wherein authorization requests for a corresponding communication device are processed in parallel so as to avoid redundant operation of the RTT test;
    wherein in authentication processing of a current authentication request, if a prior RTT test is being performed corresponding to a prior authentication request originating from the same communication device, then the current RTT test is not performed, and authentication processing waits for the completion of the prior RTT test; and
    after the prior RTT test has been completed, if the result of the prior RTT test is successful, then authentication processing uses the result of the prior RTT test as the result corresponding to the current authentication request, and if the result of the prior RTT test is not successful, authentication processing performs the current RTT test corresponding to the current authentication request.

2. The communication apparatus according to claim 1, wherein:
    the communication apparatus and the communication device perform data communication based on an IEEE 1394 standard.

3. The communication apparatus according to claim 1, wherein:
    the authentication processing includes a first processing for sharing an authentication key with the communication device having issued the target authentication request, the RTT test, and a second processing configured to transmit to the communication device an exchange key encoded with the authentication key;
    the data communication portion performs encoded data communication by using the exchange key with the communication device to which the exchange key has been transmitted; and
    if, in authentication processing of a current authentication request, after performing the first processing, the prior RTT test is being performed corresponding to a prior authentication request originating from the same communication device, the current RTT test is not performed, and authentication processing waits for the completion of the prior RTT test and,
    if the result of the prior RTT test is successful, authentication processing performs the second processing.

4. The communication apparatus according to claim 3, wherein:
    if the result of the prior RTT test is not successful, authentication processing performs the current RTT test; and
    if the result of the prior RTT test is successful, authentication processing portion performs the second processing.

5. The communication apparatus according to claim 1, wherein:
    the communication apparatus and the communication device perform data communication based on an IEEE 1394 standard.

6. The communication apparatus according to claim 1, wherein:
    the communication portion transmits data of an audio/visual (AV) content in the data communication.

7. A communication apparatus that performs data communication with a communication device, the communication apparatus comprising:
    an authentication processing portion configured to perform authentication processing based on a Digital Transmission Content Protection ("DTCP") standard, including a round trip time (RTT) test on authentication requests received from one or more unauthenticated communication devices; and
    a data communication portion configured to perform data communications with the communication device authenticated by the authentication processing portion;
    wherein authorization requests for a corresponding communication device are processed in parallel so as to avoid redundant operation of the RTT test;
    wherein in authentication processing of a current authentication request, if a prior RTT test is being performed corresponding to a prior authentication request originating from the same communication device, then the current RTT test is not performed, and authentication processing uses the result of the prior RTT test when completed.

8. The communication apparatus according to claim 7, wherein:
    the authentication processing includes a first processing for sharing an authentication key with the communication device having issued the target authentication request, the RTT test, and a second processing configured to transmit to the communication device an exchange key encoded with the authentication key;
    the data communication portion performs encoded data communication by using the exchange key with the communication device to which the exchange key has been transmitted;
    in authentication processing of a current authentication request, after performing the first processing, if the prior RTT test is being performed corresponding to a prior authentication request originating from the same communication device, then the current RTT test is not performed, and authentication processing waits for the completion of the prior RTT test; and
    after the prior RTT test has been completed, if the result of the prior RTT test is successful, then authentication processing performs the second processing, and if the result of the prior RTT test is not successful, then authentication processing does not perform the second processing.

9. The communication apparatus according to claim 7, wherein:
the communication apparatus and the communication device perform data communication based on an IEEE 1394 standard.

10. A computer program stored in a non-transitory storage medium configured to be read and executed by a computer that performs data communication with a communication device, the program causing the computer to function as:
an authentication processing portion configured to perform authentication processing based on a Digital Transmission Content Protection ("DTCP") standard, including a round trip time (RTT) test on authentication requests received from one or more unauthenticated communication devices; and
a data communication portion configured to perform data communications with the communication device authenticated by the authentication processing portion,
wherein authorization requests for a corresponding communication device are processed in parallel so as to avoid redundant operation of the RTT test;
wherein in authentication processing of a current authentication request, if a prior RTT test is being performed corresponding to a prior authentication request originating from the same communication device, then the current RTT test is not performed, and authentication processing waits for the completion of the prior RTT test; and
after the prior RTT test has been completed, if the result of the prior RTT test is successful, then authentication processing uses the result of the prior RTT test as the result corresponding to the current authorization request, and if the result of the prior RTT test is not successful, authentication processing performs the current RTT test corresponding to the current authentication request.

11. The computer program stored in the non-transitory storage medium according to claim 10, wherein:
the computer and the communication device perform data communication based on an IEEE 1394 standard.

12. The computer program stored in the non-transitory storage medium according to claim 10, wherein:
the authentication processing includes a first processing for sharing an authentication key with the communication device having issued the target authentication request, the RTT test, and a second processing configured to transmit to the communication device an exchange key encoded with the authentication key;
the data communication portion performs the encoded data communication by using the exchange key with the communication device to which the exchange key has been transmitted;
in authentication processing of a current authentication request, after performing the first processing, if the prior RTT test is being performed corresponding to a prior authentication request originating from the same communication device, then the current RTT test is not performed and authentication processing waits for the completion of the prior RTT test; and
after the prior RTT test has been completed, if the result of the prior RTT test is successful, then authentication processing performs a second processing.

13. The computer program stored in the non-transitory storage medium according to claim 12, wherein:
if the result of the prior RTT test is not successful, authentication processing performs the current RTT test; and
if the result of the prior RTT test is successful, the authentication processing performs the second processing.

14. The computer program stored in the non-transitory storage medium according to claim 10, wherein:
the computer and the communication device perform data communication based on an IEEE 1394 standard.

15. The computer program stored in the non-transitory storage medium according to claim 10, wherein
the communication portion transmits data of an audio/visual (AV) content in the data communication.

16. A computer program stored in the non-transitory storage medium and configured to be read and executed by a computer that performs data communication with a communication device, the program causing the computer to function as:
an authentication processing portion configured to perform authentication processing based on a Digital Transmission Content Protection ("DTCP") standard, including a round trip time (RTT) test on authentication requests received from one or more unauthenticated communication devices; and
a data communication portion configured to perform data communication with the communication device authenticated by the authentication processing portion;
wherein authorization requests for a corresponding communication device are processed in parallel so as to avoid redundant operation of the RTT test;
wherein in authentication processing of a current authentication request, if a prior RTT test is being performed corresponding to a prior authentication request originating from the same communication device, then the current RTT test is not performed, and authentication processing uses the result of the prior RTT test when completed.

17. The computer program stored in the non-transitory storage medium according to claim 16, wherein:
the authentication processing includes a first processing for sharing an authentication key with the communication device having issued the target authentication request, the RTT test, and a second processing configured to transmit to the communication device an exchange key encoded with the authentication key;
the data communication portion performs the encoded data communication by using the exchange key with the communication device to which the exchange key has been transmitted; and
in authentication processing of a current authentication request, after performing the first processing, if the prior RTT test is being performed corresponding to a prior authentication request originating from the same communication device, then the current RTT test is not performed, and authentication processing waits for the completion of the prior RTT; and
after the prior RTT test has been completed, if the result of the prior RTT test is successful, then authentication processing performs the second processing, and if the result of the prior RTT test is not successful, then authentication processing does not perform the second processing.

18. The computer program stored in the non-transitory storage medium according to claim 16, wherein:
the computer and the communication device perform data communication based on an IEEE 1394 standard.

* * * * *